(12) United States Patent
Vettiger et al.

(10) Patent No.: US 6,757,125 B2
(45) Date of Patent: Jun. 29, 2004

(54) HEAD SUSPENSION FOR DISK-BASED DATA STORAGE APPARATUS

(75) Inventors: Peter Vettiger, Langnau am Albis (CH); Walter Haeberle, Waedenswil (CH); Gerd Binnig, Wollerau (CH)

(73) Assignee: Hitachi Global Storage Technologies Netherlands B.V., Amsterdam (NL)

(*) Notice: Subject to any disclaimer, the term of this patent is extended or adjusted under 35 U.S.C. 154(b) by 492 days.

(21) Appl. No.: 09/917,498

(22) Filed: Jul. 27, 2001

(65) Prior Publication Data

US 2002/0034035 A1 Mar. 21, 2002

(30) Foreign Application Priority Data

Jul. 27, 2000 (EP) .......................................... 00810672

(51) Int. Cl.⁷ .............................................. G11B 21/02
(52) U.S. Cl. ............................................ 360/75; 360/31
(58) Field of Search ............................. 360/25, 31, 75, 360/55

(56) References Cited

U.S. PATENT DOCUMENTS

| 5,114,913 A | * | 5/1992 | Coufal et al. ............... 505/171 |
| 5,880,901 A | | 3/1999 | Smith et al. ................. 360/75 |
| 5,901,001 A | | 5/1999 | Meyer et al. ................ 360/25 |
| 5,991,113 A | * | 11/1999 | Meyer et al. ................ 360/75 |
| 6,002,539 A | | 12/1999 | Smith et al. ................. 360/65 |
| 6,084,754 A | | 7/2000 | Smith et al. ............... 360/135 |

FOREIGN PATENT DOCUMENTS

EP        0 0813 187 A2   12/1997   ............ G11B/5/55

* cited by examiner

Primary Examiner—Andrew L. Sniezek
(74) Attorney, Agent, or Firm—Lewis L. Nunnelley

(57) ABSTRACT

A head suspension for maintaining a gap between a read-write head and a data storage disk comprises a heater for heating gas in the gap; and a sensor for generating an output indicative of the thickness of the gap. The sensor generates the output in dependence on thermal conductance across the gap. The apparatus can be used to control the thickness of the gap.

13 Claims, 4 Drawing Sheets

HEAD SUSPENSION FOR DISK-BASED DATA STORAGE APPARATUS

TECHNICAL FIELD

The present invention generally relates to data storage apparatus and particularly relates to a head suspensions for disk-based data storage apparatus.

BACKGROUND OF THE INVENTION

Conventional disk-based data storage apparatus comprises a rotatable data storage disk and a head suspension supporting a read/write head for generally radial movement across the surface of the disk. In operation, the head "flies" over the rotating disk spaced from the surface of the disk by an air gap. The thickness of the gap is usually referred to as the "flying height" of the head. Continuing advances in digital data recording onto disk are achieving increasing data recording densities. However, increased data recording densities demand corresponding reductions in spacing between the head and disk. The reduced flying height of the head, in turn, demands increased stability in the head-disk spacing. It would be desirable therefore to provide a relatively fast and highly sensitive sensor system for measuring the spacing between disk and the head.

SUMMARY OF THE INVENTION

In accordance with the present invention, there is now provided a head suspension for maintaining a gap between a read-write head and a data storage disk, the head suspension comprising: a heater for heating gas in the gap; and a sensor for generating an output indicative of the thickness of the gap, the sensor generating the output in dependence on thermal conductance across the gap.

Heat from the heater is transferred through the gap from the sensor to the disk by thermal conduction. The disk acts as a heat sink dissipating the heat transferred. If the thickness of the air gap decreases, conduction of heat from the sensor to the disk increases. The temperature of the heater therefore decreases. The temperature decrease at the heater, and therefore the corresponding decrease in gap thickness, is detected by the sensor. Conversely, if the thickness of the air gap increases, conduction of heat from the sensor to the disk decreases. The temperature of the heater therefore increases. The temperature increase at the heater, and therefore the corresponding increase in gap thickness, is detected by the sensor. The aforementioned temperature changes can be easily detected electrically, by monitoring, for example, current flow through a thermally-sensitive resistance. A similar technique is employed in the field of atomic force microscopy.

The present invention advantageously provides a relatively, low cost, fast and highly sensitive sensor system for measuring the spacing between the disk and the head in a disk storage apparatus.

In the interests of simplicity, the heater is preferably integral to the sensor. In preferred embodiments of the present invention to be described shortly, the sensor comprises a bar of silicon. The heater may then conveniently comprise a narrowed portion of the bar. The narrowed portion may, in turn, comprise a doped region thereby enhancing the sensitivity of the sensor. In the embodiments of the present invention, the head suspension comprises an elongate body having a first silicon layer, a silicon oxide layer disposed on the first silicon layer and a second silicon layer disposed on the silicon oxide layer, wherein the bar is located in the second silicon layer. Preferably, one end of the bar terminates in the second silicon layer and the other end of the bar terminates in an electrical contact isolated from second silicon layer. An aperture may be disposed between the narrowed portion and the silicon oxide layer to improve thermal isolation of the narrowed region. The head suspension may include an integral read-write head.

The present invention extends to control apparatus for controlling the thickness of a gap between a read-write head and a data storage disk, the control apparatus comprising: a head suspension as hereinbefore described; a comparator for generating an error signal indicative of any difference between the output from the sensor and a desired gap thickness; and an actuator for moving the head suspension relative to the disk to vary the thickness of the gap in dependence on the error signal.

The present invention also extends to disk storage apparatus comprising: a data storage disk; a read-write head; and control apparatus as hereinbefore described, for controlling the thickness of a gap between the head and the disk.

Viewing the present invention from another aspect, there is now provided a method for maintaining a gap between a read-write head and a data storage disk, the method comprising: supporting the read-write head via a head suspension; heating gas in the gap via a heater provided on the head suspension; and, generating an output indicative of the thickness of the gap in dependence on thermal conductance across the gap.

Viewing the present invention from yet another aspect, there is now provided a method for controlling the thickness of a gap between a read-write head and a data storage disk, the method comprising: supporting the read-write head via a head suspension; heating gas in the gap via a heater provided on the head suspension; generating an output indicative of the thickness of the gap in dependence on thermal conductance across the gap; generating an error signal indicative of any difference between the output from the sensor and a desired gap thickness; and, moving the head suspension relative to the disk to vary the thickness of the gap in dependence on the error signal

BRIEF DESCRIPTION OF THE DRAWINGS

Preferred embodiments of the present invention will now be described, by way of example only, with reference to the accompanying drawings, in which.

DETAILED DESCRIPTION OF A PREFERRED EMBODIMENT

Figure 1:
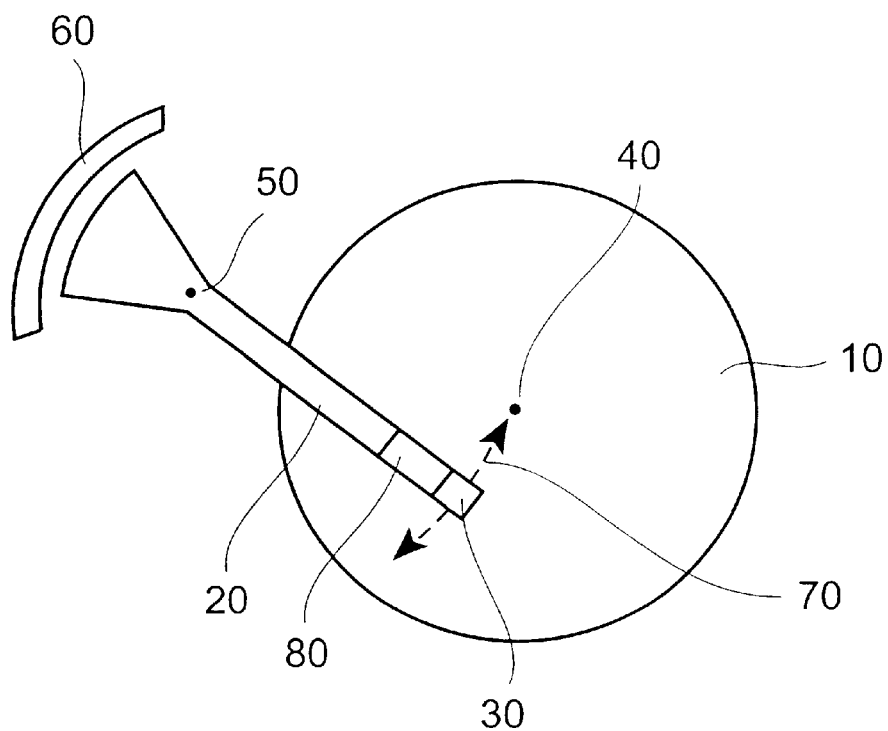
FIG. 1 is a plan view of a disk-based data storage apparatus.

Referring first to FIG. 1, an example of data storage apparatus embodying the present invention comprises a data storage disk 10 mounted for rotation on a central spindle 40 and a read/write transducer head 30 mounted on an elongate head suspension 20. Depending on the data storage medium employed in the disk 10, the head 30 may be a magnetic head, magneto-resistive head, magneto-optic head, optical head, or the other type of head. In some embodiments of the present invention, the head 30 may be integral to the head suspension 20. The head suspension 20 is pivotally mounted at a pivot point 50 remote from the disk 10. A coil 60 is disposed adjacent the end of the head suspension 20 remote from the head 30. In operation, the coil 60 permits controllable deflection of the head suspension 20 about the pivot point 50 and thus controllable movement of the head along a generally radial path 70 across the surface of the disk 10. In operation, the head 30 "flies" over the rotating disk 10 spaced from the surface of the disk 10 by an air gap spacing or "flying height". The head 30 can be simultaneously moved radially across the surface of the rotating disk 10 via the head suspension 20. The head suspension 20 thus allows the head 30 to address substantially any point on the surface of the disk 30. A region of the head suspension 20 adjacent the head 30 will now be described with reference to FIG. 2.

Figure 2:
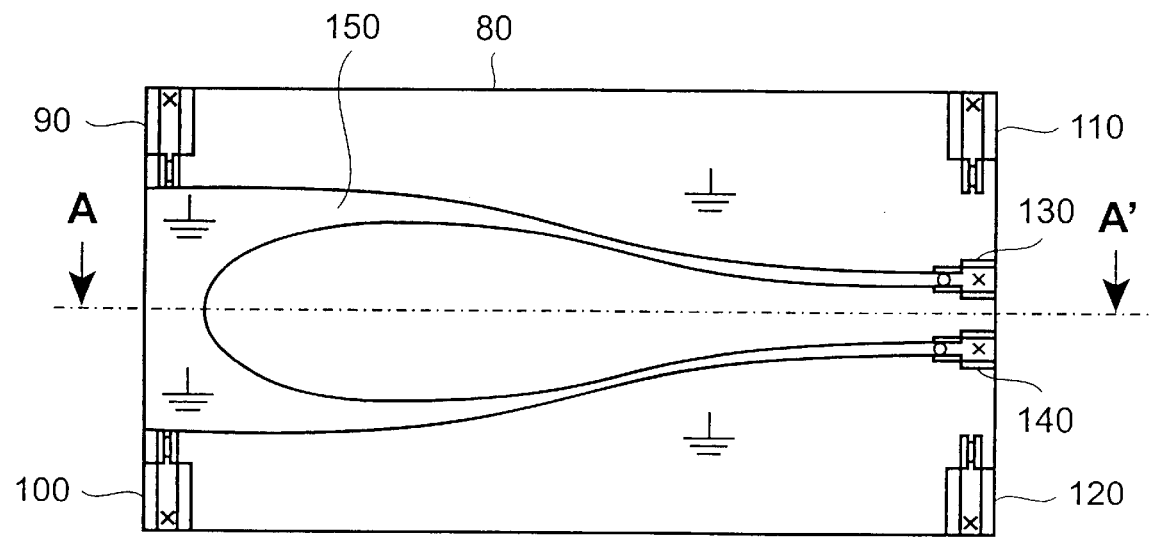
FIG. 2 is a bottom plan view of part of a head suspension of the storage apparatus.

Referring to FIG. 2, the region of the head suspension adjacent the head 30 comprises an elongate body 80 having a substantially U-shaped recess 150 formed therein. Sensors 90 and 100 are located at the end of the body 80 adjacent the head 30. Also, sensors 110 and 120 are located at the end of the body the remote from head 30. Additionally, sensors 130 and 140 are located in the ends of the recess 150. In the assembled data storage apparatus, the sensors 90 to 140 each face the surface of the disk 10. In use, air flows through the recess 150 between the body 80 and the spinning disk 10. The air flow provides an air bearing on which the head 30 flies over the rotating disk 10. Sensors 90 and 100 generate signals indicative of the thickness of the gap between the disk 10 and the head 30. Sensors 110 and 120 detect temperature variations in the environment of head suspension 20. Sensors 130 and 140 detect variations in the air flow through the recess 150. In some embodiments of the present invention, sensor 130 may be combined with sensor 110. Likewise, sensor 140 may be combined with sensor 120.

Figure 3:
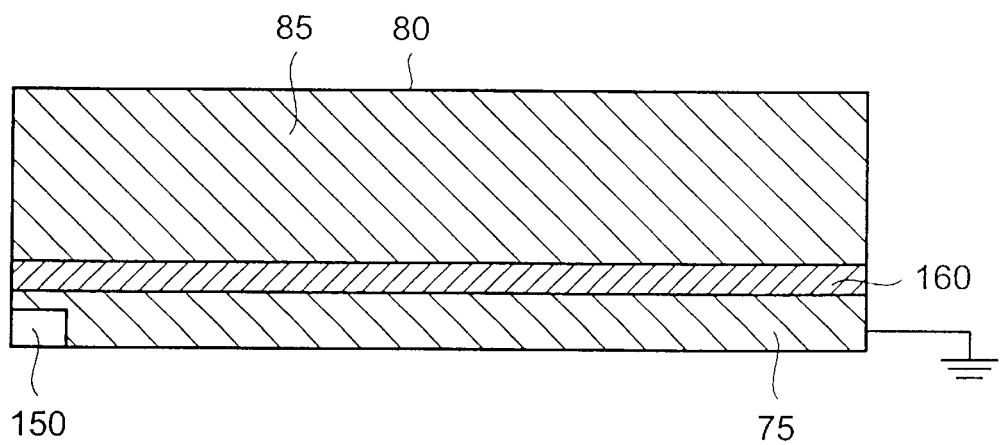
FIG. 3 is a cross section of the head along the line A–A' in FIG. 1.

With reference to FIG. 3, the body 80 comprises a silicon bulk layer 85 of a thickness in the range 1 to 5 micrometers. An electrically insulating layer 160 of silicon oxide of a thickness in the range 0.2 to 0.5 micrometers is disposed on the bulk layer 85. A grounded silicon layer 75 of a thickness of approximately 1 micro-meter, in which the recess 150 is formed, is disposed on the insulting layer 75.

Figure 4:
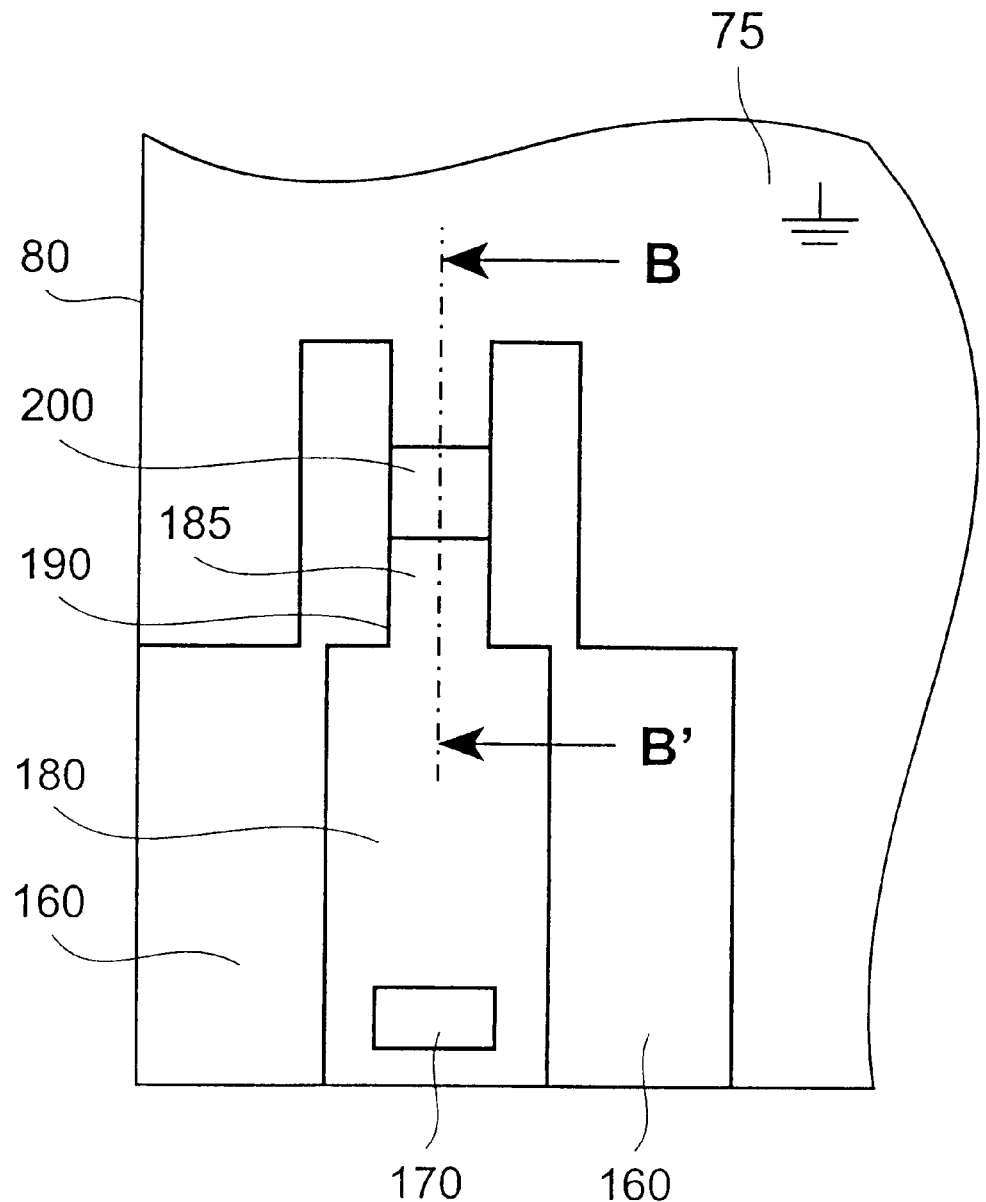
FIG. 4 is a bottom plan view of a sensor of the head suspension.

Turning now to FIG. 4, each of the sensors 90 to 140 comprises a bar 180 of silicon. The bar 180 may be formed by removing the surrounding silicon layer 75 down to the silicon oxide layer 160, by chemical etching for example. One end of the bar 180 is connected to the grounded silicon layer 75. An electrical contact 170 is disposed at the other end of the bar 180. Each sensor 90 to 140 also includes an integral heater 190. The heater 190 comprises a narrowed region 185 of the bar 180. The narrowed region 185 has a width between 500 and 600 nano-meters. The electrical contact 170 is connected to a constant power source (not shown).

The operation of the sensor 90 to 140 will now be described. It will be appreciated that sensors 100 to 140 operate in a similar manner. In operation, current flows from the power source through the bar 180 to ground. The narrowed region 185 presents an increased resistance to current flow through the bar 180. The current flow through the bar 180 thus causes heating of the narrowed region 185. Heat from the narrowed region 185 is transferred through the air gap from the sensor 90 to the rotating disk 10 by thermal conduction. The disk 10 acts as a heat sink dissipating the heat transferred. If the thickness of the air gap decreases, conduction of heat from the sensor 90 to the disk 10 increases. The temperature of the narrowed region 185 therefore decreases. Thus, the resistance of the narrowed region 185 also decreases. Power remains constant. Therefore, the current flow through the bar 180 increases. Conversely, if the thickness of the air gap increases, conduction of heat from the sensor 90 to the disk 10 decreases. The temperature of the narrowed region 185 therefore increases. Thus, the resistance of the narrowed region 185 increases. Therefore, the current flow through the bar 180 decreases. In some embodiments of the present invention, an additional sensor may be provided on the surface of the head suspension 20 remote from the disk 10 for generating an output signal indicative of ambient temperature against which the outputs from the sensors 90 to 140 may be compared.

Figure 5:
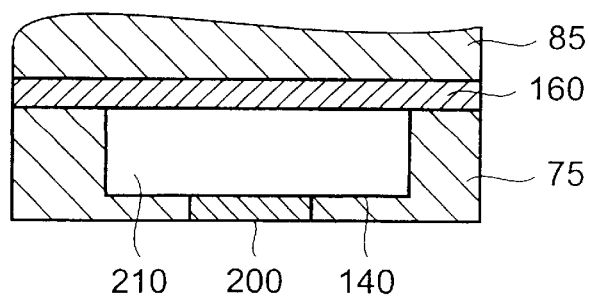
FIG. 5 is a cross section of the head along the line B–B' in FIG. 4.

The aforementioned changes in current flow through the bar 180 can be easily detected to provide an indication of changes in the thickness of the air gap between the sensor 90 and the disk 10. In particularly preferred embodiments of the present invention, the sensitivity of the sensor 90 is enhanced by doping at least a portion 200 of the narrowed region 185. The portion 200 may be doped with a positive dopant such as boron or a negative dopant such as arsenic. With reference to FIG. 5, the sensitivity of the sensor 90 is further enhanced by providing an aperture 210 of between 400 and 600 nano-meters between the narrowed region 185 and the insulating layer 160, thereby thermally isolating the narrowed region 185 from the insulating layer 160.

Figure 6:
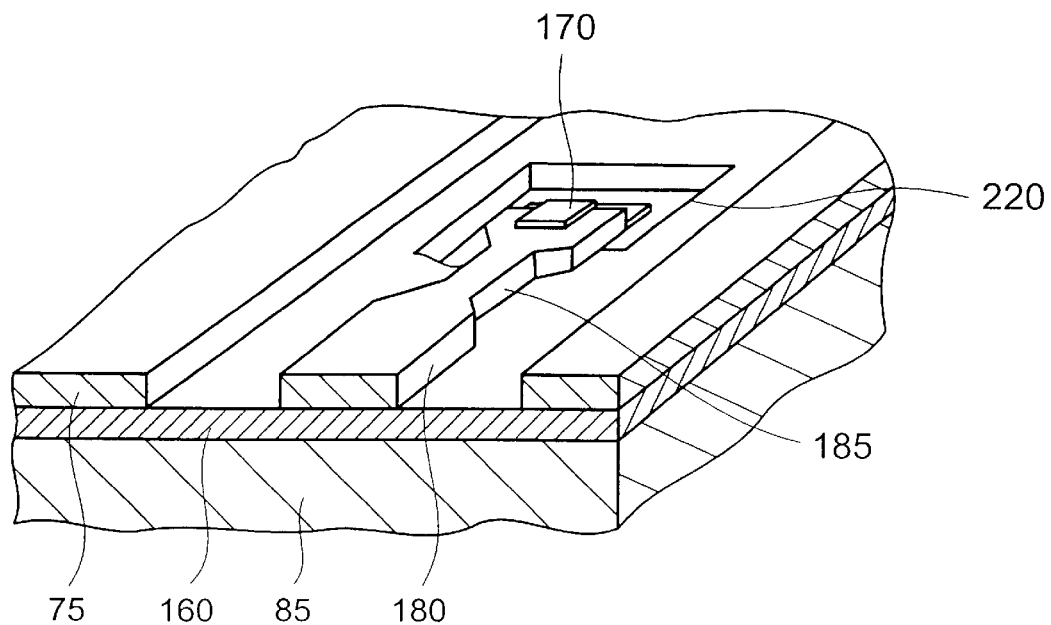
FIG. 6 is an isometric view of a sensor embodying the present invention.
Figure 7:
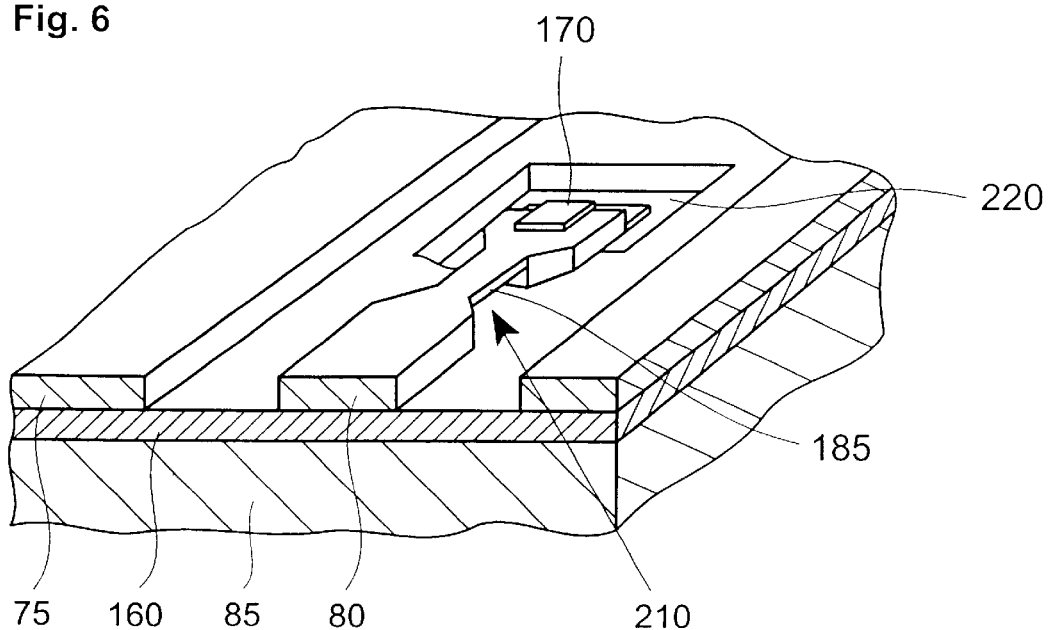
FIG. 7 is an isometric view of another sensor embodying the present invention.

Referring to FIG. 6, a via 220 is formed in the insulating layer 160 and to the bulk layer 85. The electrical contact 170 extends through the via 220 to the side of the body remote from the sensor 90. This arrangement permits convenient connection of the sensor 90 to the constant power source and other associated circuitry. FIG. 7, which is a similar view to that of FIG. 6, illustrates an embodiment of the present invention in which the aperture 210 is provided between the narrowed region 185 and the insulating layer 160.

Figure 8:
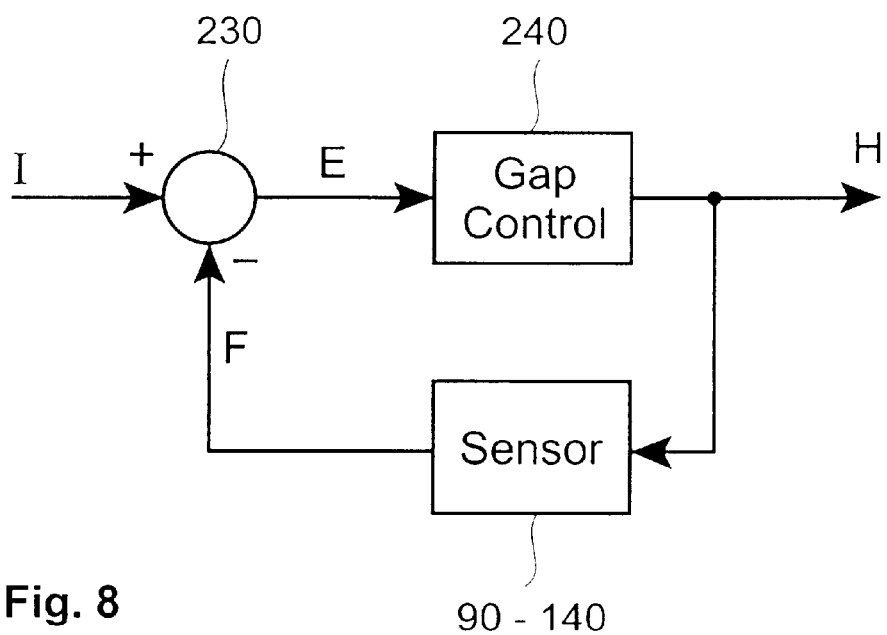
FIG. 8 is a control system of the storage apparatus.

Referring now to FIG. 8, embodiments of the present invention comprise a gap control 240 for moving the head suspension 20 in a direction parallel to its axis of pivot to adjust the thickness H of the gap between the head 30 and the disk 10. The gap control 240 comprises the piezoelectric transducer for adjusting the thickness of the gap. The gap control 240 adjusts the thickness of the gap in response to an error signal E. The error signal E is generated by a comparator in dependence on any difference between an input signal I indicative of a desired gap thickness and a feedback signal F indicative of the actual gap thickness H. The feedback signal F is generated in dependence on the outputs of the sensors 90 to 140. The sensors 90 to 140 therefore complete a negative feedback loop between the desired gap thickness I and the actual gap thickness H. The feedback loop operates to minimize the error signal E, thereby maintaining the actual gap thickness H at the desired gap thickness I. It will be apparent that the outputs from the sensor 90 to 140 may be combined in many different ways to produce the feedback signal F. Alternatively, in some embodiments of the present invention, each of sensors 90 to 140 may participate in a different one of multiple feedback control systems each controlling a different aspect of the flight path of the head 30 with the common objective of maintaining the head 30 on a level flight path relative to the surface of the disk 10. Examples of such aspects may for example include pitch and yaw of the head 30 relative to the surface of the disk 10.

The dimensions and ranges hereinbefore specified are provided by way of example only in the interest of demonstrating the relative sizes of features found in preferred embodiments of the present invention. It will be appreciated however that the dimensions and relative sizes of features found in other embodiments of the present invention may differ from those specified herein.

In the embodiments hereinbefore described, the gap between the head 30 and the disk 10 is filled with air. However, it will be appreciated, that in other embodiments of the present invention, the gap may be filled with other gaseous matter. Also, in the embodiments of the present invention hereinbefore described, each of sensors 90 to 140 comprises an integral heater 190. However, it will be recognised that in other embodiments of the present invention, the head suspension 20 may comprise discrete heaters and sensors. Furthermore, in the embodiments of the present invention hereinbefore described, the head suspension 20 comprises six heaters and six corresponding sensors. However, it will be appreciated that, in other embodiments of the present invention, the head suspension may comprise more or fewer heaters and sensors. In particular, it will be appreciated that, in some embodiments of the present invention, a single heater and an accompanying sensor may suffice.

We claim:

1. A head suspension for measuring a gap between a read-write head and a data storage disk, comprising:
    a heater for heating gas in the gap in order to make a thermal conductance measurement; and
    a sensor for generating an output during the measurement of the thermal conductance across the gap, said output being indicative of the thickness of the gap.

2. A head suspension as in claim 1, wherein said heater is integral to said sensor.

3. A head suspension as in claim 2, wherein said sensor comprises a bar of silicon.

4. A head suspension as in claim 3, wherein the heater comprises a narrowed portion of the bar of silicon.

5. A head suspension as in claim 3, comprising:
    an elongate body having a first silicon layer;
    a silicon oxide layer disposed on said first silicon layer; and
    a second silicon layer disposed on said silicon oxide layer, wherein said bar of silicon is located in the second silicon layer.

6. A head suspension as in claim 5, wherein said bar of silicon has a first end which terminates in said second silicon layer and a second end which terminates in an electrical contact isolated from said second silicon layer.

7. A head suspension as in claim 6, comprising an aperture between said narrowed portion and said silicon oxide layer.

8. A head suspension as in claim 1, wherein said narrowed portion comprises a doped region.

9. Head suspension as in claim 1, comprising an integral read-write head.

10. A control apparatus for controlling the thickness of a gap between a read-write head and a data storage disk, comprising:
    a head suspension having a heater for heating gas in a gap in order to make a thermal conductance measurement;
    a sensor for generating an output during the measurement of the thermal conductance across the gap, said output being indicative of the thickness of the gap;
    a comparator for generating an error signal indicative of any difference between the output from said sensor and an output corresponding to a desired gap thickness; and
    an actuator attached to said head suspension for moving the head suspension relative to the disk to vary the thickness of the gap in response to the error signal.

11. A disk storage apparatus, comprising:
    a data storage disk;
    a read-write head;
    a head suspension having a heater for heating gas in a gap in order to make a thermal conductance measurement and a sensor for generating an output during the measurement of the thermal conductance across the gap, said output being indicative of the thickness of the gap;
    a comparator for generating an error signal indicative of any difference between the output from said sensor and an output corresponding to a desired gap thickness; and
    an actuator attached to said head suspension for moving the head suspension relative to the disk to vary the thickness of the gap in response to the error signal.

12. A method for measuring a gap between a read-write head and a data storage disk, comprising:
    supporting the read-write head via a head suspension;
    heating gas in the gap via a heater provided on the head suspension; and
    generating an output indicative of the thickness of the gap.

13. A method for controlling the thickness of a gap between a read-write head and a data storage disk, comprising:
    supporting the read-write head with a head suspension;
    heating gas in the gap with a heater provided on the head suspension;
    generating an output indicative of the thickness of the gap in dependence on thermal conductance across the gap;
    generating an error signal indicative of any difference between the output from the sensor and an output corresponding to the desired gap thickness; and
    moving the head suspension relative to the disk to vary the thickness of the gap in response to the error signal.

* * * * *